United States Patent Office  3,161,646
Patented Dec. 15, 1964

3,161,646
1,2-BIS(SUBSTITUTED PHENYL)-3-TERTIARY-AMINO-1-PROPANOLS
Bill Elpern, Walnut Creek, Calif., assignor to Sterling Drug Inc., New York, N.Y., a corporation of Delaware
No Drawing. Filed Feb. 19, 1959, Ser. No. 794,253
18 Claims. (Cl. 260—294.7)

This invention relates to substituted diphenylethane derivatives, and is particularly concerned with 1,2-bis (substituted phenyl)-3-tertiary-amino-1-propanols further substituted in the 1-position by a hydrocarbon radical having from four to about ten carbon atoms or by a phenyl radical substituted by lower-alkoxy or lower-alkylmercapto radicals. The invention is also concerned with acid-addition and quaternary ammonium salts of said 1-propanols and a process for the preparation of said 1-propanols.

Among the compounds included within the scope of my invention are those having the general formula

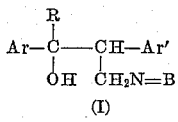

(I)

wherein Ar and Ar' represent phenyl radicals substituted by from one to three radicals selected from the class consisting of lower-alkoxy, lower-alkylmercapto and halogen; R represents a radical selected from the class consisting of alkyl having from four to about ten carbon atoms, cycloalkyl, cycloalkyl-lower-alkyl, phenyl-lower-alkyl, and phenyl substituted by from one to three radicals selected from the class consisting of lower-alkoxy and lower-alkylmercapto; and N=B represents a basic, aliphatic-type, tertiary-amino radical.

In the above general Formula I, when the group R represents an alkyl radical having from four to about ten carbon atoms it can be straight or branched, thus including such radicals as butyl, isobutyl, tertiary-butyl, pentyl, isopentyl, hexyl, isohexyl, heptyl, octyl, nonyl, decyl, and the like.

When R represents a cyloalkyl radical it can be an unsubstituted cycloalkyl radical, preferably having from four to about eight ring members, such as cyclobutyl, cyclopentyl, cyclohexyl, cycloheptyl, cyclooctyl, or the like; or a lower-alkylated cycloalkyl radical such as 2-methylcyclopentyl, 4-ethylcyclohexyl, or the like. A preferred group of cycloalkyl radicals are those having five or six ring members, including cyclopentyl, cyclohexyl and lower-alkylated derivatives thereof.

When R represents a cycloalkyl-lower-alkyl radical it includes cycloalkyl radicals of the foregoing type joined to a lower-alkyl radical having from one to about four carbon atoms, thus including such radicals as cyclohexylmethyl, 2-cyclohexyl-ethyl, 3-cyclopentylpropyl, 2-(4-methylcyclohexyl)ethyl, 4-cyclohexylbutyl, 3-cyclohexylbutyl, and the like.

When R represents a phenyl-lower-alkyl radical it includes lower-alkyl radicals having from one to about four carbon atoms substituted by a phenyl radical, thus including such radicals as benzyl, 2-phenylethyl, 3-phenylpropyl, 2-phenylpropyl, 4-phenylbutyl, and the like.

When lower-alkoxy or lower-alkylmercapto radicals are present as substituents of Ar and/or Ar' in the above general formula I, they preferably contain from one to about four carbon atoms, and thus include such specific radicals as methoxy, ethoxy, propoxy, isopropoxy, butoxy, isobutoxy, methylmercapto, ethylmercapto, propylmercapto, isopropylmercapto, butylmercapto, isobutylmercapto, and the like. When halogen radicals are present as substituents of Ar and/or Ar', they can be any of the four halogens, fluorine, chlorine, bromine or iodine. The radicals Ar and Ar' can be the same or different in any given compound.

When R in the above general Formula I represents a phenyl radical substituted by lower-alkoxy or lower-alkyl-mercapto radicals, the lower-alkoxy and lower-alkylmercapto radicals are of the same type as those described above in connection with the substituents of Ar and Ar'.

In the above general Formula I, N=B represents a basic, aliphatic-type, tertiary-amino radical. These tertiary-amines are of the type —N(Y)(Y') wherein Y and Y' are aliphatic substituents such as lower-alkyl, cycloalkyl, alkenyl and the like or where Y and Y' are joined to form a non-aromatic type heterocyclic ring. A preferred group of N=B includes the radicals di-lower-alkylamino, 1-piperidyl, 1-pyrrolidyl, and 4-morpholinyl, and lower-alkylated derivatives of said 1-piperidyl, 1-pyrrolidyl, and 4-morpholinyl radicals. In the di-lower-alkylamino radicals the lower-alkyl radicals can have from one to about six carbon atoms and can be the same or different.

The compounds of my invention are prepared according to the following reaction scheme:

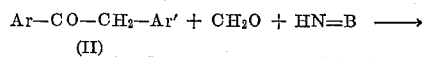

(II)

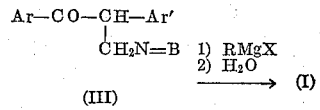

(III)

The starting materials of Formula II belong to a known class of desoxybenzoin derivatives, and are readily prepared by a Friedel-Crafts reaction between a substituted phenylacetyl chloride, ClCOCH$_2$Ar', and a substituted benzene, ArH. The desoxybenzoin (II) is reacted with formaldehyde and a secondary amine, HN=B, either in the free form or acid-addition salt form, and a 1,2-bis (substituted phenyl)-3-tertiary-amino-1-propanone (III) is thus obtained. The reaction is carried out under conditions commonly used for the Mannich reaction, e.g., in the presence of an inert reaction medium at a temperature between about 50° C. and 150° C.

The amino ketone (III) is then reacted with a Grignard reagent, RMgX, wherein X is halogen selected from chlorine, bromine and iodine, and the resulting intermediate complex is hydrolyzed to produce an amino-carbinol of Formula I. The Grignard reaction is carried out in an inert reaction medium at a temperature between about 0° C. and 150° C.

The compounds of the invention are most conveniently used in the form of water-soluble, non-toxic acid-addition and quaternary ammonium salts, which are the full equivalents of the compounds herein particularly claimed. Non-toxic salts are therapeutically acceptable salts whose anions are relatively innocuous to animal organisms in therapeutic doses of the salts, so that the beneficial physiological properties inherent in the free bases are not vitiated by side-effects ascribable to the anions; in other words, the latter do not substantially increase the toxicity inherent in the cations. Appropriate acid-addition salts are those derived from mineral acids such as hydrochloric acid, hydrobromic acid, hydriodic acid, nitric acid, sulfuric acid, and phosphoric acid; and organic acids such as acetic acid, citric acid, lactic acid, tartaric acid, ethanesulfonic acid, and quinic acid. The quaternary ammonium salts are obtained by the addition of esters of strong acids to the free base form of the compounds, said esters having a molecular weight less than about 200. A preferred class of esters comprises alkyl, alkenyl, and monocarbocyclic aryl-lower-alkyl esters of strong inorganic acids or organic sulfonic acids, including such compounds as methyl chloride, methyl bromide, methyl iodide, ethyl bromide, propyl chloride, allyl chloride, allyl bromide, methyl sulfate, methyl benzene-sulfonate, methyl p-toluenesulfonate, benzyl chloride, benzyl bromide, and substituted benzyl halides, such as p-chlorobenzyl chloride, p-nitrobenzyl chloride, p-methoxybenzyl chloride, o-chlorobenzyl chloride, and the like.

The acid-addition salts are prepared either by dissolving the free base in an aqueous solution containing the appropriate acid, and isolating the salt by evaporating the solution, or by reacting the free base and acid in an organic solvent, in which case the salt separates directly or can be obtained by concentration of the solution.

The quaternary ammonium salts are prepared by mixing the free base and ester of a strong acid in an inert solvent. Heating may be used to facilitate the reaction, although salt formation usually takes place readily at room temperature. The quaternary ammonium salt separates directly or can be obtained by concentration of the solution.

It is also possible to convert one quaternary ammonium salt to another in which the anion is different. If the anion of the original quaternary salt forms a water-insoluble silver salt, the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid can be obtained.

Acid-addition and quaternary ammonium salts having toxic anions are likewise useful when employed as intermediates in the purification of the free bases and in conversion to other salts, and as characterizing derivatives of the free bases.

The structures of the compounds of the invention are established by the mode of their preparation and by chemical analysis establishing the percentage composition of carbon, hydrogen and nitrogen. The presence of a single basic nitrogen atom was confirmed by analysis and by salt formation.

Pharmacological evaluation of the compounds of the invention having the Formula I has shown that they are useful as cardiac antiaccelerators. They possess a mode of action somewhat similar to that of veratramine and thus are useful in treatment of hypertensive states. The compounds of the invention are, however, much less toxic than veratramine; for example, the former were found to have an intravenous $LD_{50}$ value in mice of about 30 mg./kg., and an oral $LD_{50}$ of at least several hundred mg./kg., whereas the values for veratramine were 3.68 ±0.24 mg./kg. and 13±2.1 mg./kg., respectively. The compounds of the invention are active at dose levels of about 20–100 micrograms per heart when measured on the isolated rabbit heart. When the group R has less than four carbon atoms the activity falls off markedly. The compounds can be administered orally as tablets or capsules compounded with conventional excipients, or parenterally or intravenously as aqueous solutions.

Pharmacological evaluation of the compounds of the invention has also shown that they are useful as coronary dilator agents. When measured on the isolated rabbit heart by the method of Luduena et al., J. Am. Pharm. Assoc., Sci. Ed., 44, 363–6 (1955), they exhibited a coronary dilator activity ranging from one to ten times that of papaverine.

Endocrinological evaluation of the compounds of the invention having the Formula I in their free base or acid-addition salt forms has shown that they are useful as pituitary inhibitors while lacking the estrogenic or androgenic effect which usually accompanies such activity. Optimum activity for pituitary inhibition appears to occur in those compounds in which the group R has from six to eight carbon atoms. The compounds are utilized in the form of sterile aqueous solutions for intramuscular injection in the case of the acid-addition salts. In the case of the free bases, they are prepared for use in the form of sterile aqueous or saline suspensions or oil solutions for intramuscular injection. Alternatively, the compounds can be administered orally compounded as capsules or tablets with conventional excipients.

The quaternary ammonium salts of the compounds of Formula I have been found to possess ganglionic blocking activity and thus can be utilized in the same way as conventional ganglionic blocking agents such as tetraethylammonium bromide and hexamethonium.

The following examples will further illustrate the invention without limiting the same thereto.

*Example 1*

(a) *1,2-bis(4-methoxyphenyl)-3-dimethylamino-1-propanone* [III; Ar, Ar' are $4-CH_3OC_6H_4$, N=B is $$N(CH_3)_2]$$

A mixture of 76.9 g. (0.3 mole) of desoxyanisoin, 25.6 g. (0.314 mole) of dimethylamine hydrochloride, 18.0 g. of paraformaldehyde and 250 ml. of absolute ethanol was refluxed for forty hours. An additional 2.0 g. of paraformaldehyde was then added and the mixture refluxed for nine hours longer. The reaction mixture was cooled, diluted with 2–3 volumes of ether, and the product which separated was collected by filtration and washed with ether. The 78.3 g. of product thus obtained was dissolved in water and the solution was made basic with 35% sodium hydroxide solution. The gummy material which separated slowly crystallized upon standing, and was separated by decanting the supernatant liquid, giving 63 g. of 1,2-bis(4-methoxyphenyl)-3-dimethylamino-1-propanone, M.P. 43–47° C. The free base was dissolved in absolute ethanol, made acid to Congo red by the addition of 10% alcoholic hydrogen chloride, and the product was caused to precipitate by the addition of ether. The product was collected by filtration, giving 55.0 g. of 1,2-bis(4-methoxyphenyl)-3-dimethylamino-1-propanone in the form of its hydrochloride salt. The analytic sample was recrystallized from an ethanol-ether mixture and had the M.P. 166.5–167.5° C. (corr.).

*Analysis.*—Calcd. for $C_{19}H_{23}NO_3HCl$: C, 65.23; H, 6.92; Cl, 10.14. Found: C, 65.04; H, 6.83; Cl, 10.04.

By replacement of the desoxyanisoin in the preceding preparation by a molar equivalent amount of 4,4'-diethoxydesoxybenzoin or p-methoxyphenyl p-ethoxybenzyl ketone, there can be obtained, respectively, 1,2-bis-(4-ethoxyphenyl)-3-dimethylamino-1-propanone [III; Ar, Ar' are $4-C_2H_5OC_6H_4$, N=B is $N(CH_3)_2$], or 1-(4-methoxyphenyl) - 2 - (4-ethoxyphenyl) - 3 - dimethylamino-1-propanone [III; Ar is $4-CH_3OC_6H_4$, Ar' is $4-C_2H_5OC_6H_4$, N=B is $N(CH_3)_2$].

By replacement of the dimethylamine hydrochloride in the preceding preparation by a molar equivalent amount of diethylamine hydrochloride, dipropylamine hydrochloride, methylethylamine hydrochloride, dibutylamine hydrochloride, dihexylamine hydrochloride, piperidine hydrochloride, pyrrolidine hydrochloride, morpholine hydrochloride, or 2-methylpiperidine hydrochloride, there can be obtained, respectively, 1,2 - bis(4-methoxyphenyl) - 3 - diethylamino - 1 - propanone [III; Ar, Ar' are $4-CH_3OC_6H_4$, N=B is $N(C_2H_5)_2$], 1,2 - bis(4-methoxyphenyl) - 3 - dipropylamino - 1 - propanone [III; Ar, Ar' are $4-CH_3OC_6H_4$, N=B is $N(C_3H_7)_2$], 1,2 - bis (4-methoxyphenyl) - 3 - methylethylamino - 1 - propanone [III; Ar, Ar' are $4-CH_3OC_6H_4$, N=B is $N(CH_3)(C_2H_5)$], 1,2 - bis(4-methoxyphenyl) - 3 - dibutylamino - 1- propanone [III; Ar, Ar' are 4-CH$_3$OC$_6$H$_4$, N=B is N(C$_4$H$_9$)$_2$], 1,2 - bis(4-methoxyphenyl) - 3 - dihexylamino - 1 - propanone [III; Ar, Ar' are 4-CH$_3$OC$_6$H$_4$, N=B is N(C$_6$H$_{13}$)$_2$], 1,2 - bis(4-methoxyphenyl) - 3 - (1-piperidyl) - 1 - propanone [III; Ar, Ar' are 4-CH$_3$OC$_6$H$_4$, N=B is NC$_5$H$_{10}$], 1,2 - bis(4-methoxyphenyl) - 3 - (1-pyrrolidyl) - 1 - propanone [III; Ar, Ar' are 4-CH$_3$OC$_6$H$_4$, N=B is NC$_4$H$_8$], 1,2 - bis(4-methoxyphenyl) - 3 - (4-morpholinyl) - 1 - propanone [III; Ar, Ar' are 4-CH$_3$OC$_6$H$_4$, N=B is NC$_4$H$_8$O], or 1,2 -bis(4-methoxyphenyl) - 3 - (2-methyl-1-piperidyl)-1-propanone [III; Ar, Ar' are 4-CH$_3$OC$_6$H$_4$, N=B is NC$_5$H$_9$(CH$_3$)].

An excess of methyl iodide was added to 6.3 g. of 1,2-bis-(4-methoxyphenyl)-3-dimethylamino-1-propanone in 30 ml. of benzene, and the mixture was heated on a steam bath for five minutes. The reaction mixture was kept at room temperature overnight, and the crystalline material which had separated was collected by filtration and washed with benzene, giving 7.5 g. of 1,2-bis(4-methoxyphenyl)-3-dimethylamino-1-propanone in the form of its methiodide salt. A sample when recrystallized from a methanol-ethyl acetate mixture had the m.p. 194.0-194.5° C. (corr.).

*Analysis.*—Calcd. for C$_{20}$H$_{26}$INO$_3$: C, 52.75; H, 5.76; I, 27.87. Found: C, 52.68; H, 5.73; I, 27.95.

1,2 - bis(4-methoxyphenyl) - 3 - dimethylamino - 1 - propanone methiodide was found to be at least as active as tetraethyl-ammonium bromide in blockade of the parasympathetic ganglia when measured by the carotid occlusion test in dogs.

(b) *2,3 - bis(4-methoxyphenyl) - 1 - dimethylamino-5 -methyl - 3 - hexanol* [I; R is CH$_2$CH(CH$_3$)$_2$, Ar and Ar' are 4-CH$_3$OC$_6$H$_4$, N=B is N(CH$_3$)$_2$].—Isobutyl bromide (16.4 g., 0.12 mole) was added to a stirred suspension of 2.9 g. (0.12 mole) of magnesium turnings in 250 ml. of dry ether, the reaction was initiated by gentle heating, and the mixture was refluxed until the magnesium had been consumed (about three hours). To the resulting Grignard reagent, cooled to 10° C., was added a solution of 12.5 g. (0.04 mole) of 1,2-bis(4-methoxyphenyl)-3-dimethylamino-1-propanone (prepared from 14.0 g. of the hydrochloride salt by reaction with dilute sodium hydroxide, extraction with ether and benzene, and drying and concentrating the organic layers) in 200 ml. of dry toluene. The mixture was allowed to warm to room temperature and the ether was distilled off on a steam bath. The remaining toluene solution was refluxed for three hours at 90° C. and then allowed to stand at room temperature for about fifteen hours. The reaction mixture was poured into ice water containing 120 g. of ammonium chloride, and the mixture was warmed and stirred on a steam bath for one-half hour to complete hydrolysis. The organic layer was separated and the aqueous layer extracted with ether. The combined organic layers were washed with water and concentrated. The residue was dissolved in absolute alcohol and made acid to Congo red by adding 5 ml. of concentrated hydrochloric acid. The solution was evaporated to dryness in vacuo, and the residue crystallized upon adding dry ether, giving 14.5 g. of 2,3-bis(4-methoxyphenyl)-1-dimethylamino-5-methyl-3-hexanol in the form of its hydrochloride salt, m.p. 174-180° C. When recrystallized twice from an isopropyl alcohol-ether mixture, a sample was obtained with the m.p. 184.5-186° C. (corr.).

*Analysis.*—Calcd. for C$_{23}$H$_{33}$NO$_3$·HCl: C, 67.71; H, 8.40; Cl, 8.69. Found: C, 67.91; H, 8.23; Cl. 8.82.

2,3 - bis(4-methoxyphenyl) - 1 - dimethylamino - 5-methyl-3-hexanol hydrochloride was found to have a cardiac decelerator activity of 48 micrograms per heart (approximate effective dose, AED$_{50}$) when measured upon the isolated rabbit heart. It had an intravenous toxicity (ALD$_{50}$) in mice of 32.6 mg./kg.

By replacement of the 1,2-bis(4-methoxyphenyl)-3-dimethylamino-1-propanone in the preceding preparation by a molar equivalent amount of 1,2 - bis(4-ethoxyphenyl) - 3 - dimethylamino - 1 - propanone, 1 - (4-methoxyphenyl) - 2 - (4-ethoxyphenyl) - 3 - dimethylamino-1-propanone, 1,2 - bis(4-methoxyphenyl) - 3 - diethylamino - 1 - propanone, 1,2 - bis(4-methoxyphenyl) - 3 - dipropylamino - 1 - propanone, 1,2 - bis(4-methoxyphenyl) - 3 - methylethylamino - 1 - propanone, 1,2 - bis(4-methoxyphenyl) - 3 - dibutylamino - 1 - propanone, 1,2 - bis(4-methoxyphenyl) - 3 - dihexylamino - 1 - propanone, 1,2 - bis(4-methoxyphenyl) - 3 - (1-piperidyl) - 1 - propanone, 1,2 - bis(4-methoxyphenyl) - 3 - (1-pyrrolidyl) - 1 - propanone, 1,2 - bis(4-methoxyphenyl) - 3 - (4-morpholinyl) - 1 - propanone, or 1,2 - bis(4-methoxyphenyl) - 3 - (2-methyl - 1 - piperidyl)-1-propanone, there can be obtained, respectively, 2,3 - bis(4-ethoxyphenyl) - 1 - dimethylamino - 5 methyl-3-hexanol [I; R is CH$_2$CH(CH$_3$)$_2$, Ar and Ar' are 4-C$_2$H$_5$OC$_6$H$_4$, N=B is N(CH$_3$)$_2$], 2-(4-ethoxyphenyl)-3-(4-methoxyphenyl)-1-dimethylamino-5-methyl-3-hexanol [I; R is CH$_2$CH(CH$_3$)$_2$, Ar is 4-CH$_3$OC$_6$H$_4$, Ar' is 4-C$_2$H$_5$OC$_6$H$_4$, N=B is N(CH$_3$)$_2$], 2,3-bis(4-methoxyphenyl)1-diethylamino-5-methyl-3-hexanol [I; R is CH$_2$CH(CH$_3$)$_2$, Ar and Ar' are 4-CH$_3$OC$_6$H$_4$, N=B is N(C$_2$H$_5$)$_2$], 2,3 - bis(4-methoxyphenyl) - 1-dipropylamino-5-methyl-3-hexanol [I; R is CH$_2$CH(CH$_3$)$_2$, Ar and Ar' are 4-CH$_3$OC$_6$H$_4$, N=B is N(C$_3$H$_7$)$_2$], 2,3-bis(4-methoxyphenyl)-1-methylethylamino-5-methyl-3-hexanol [I; R is CH$_2$CH(CH$_3$)$_2$, Ar and Ar' are 4-CH$_3$OC$_6$H$_4$, N=B is N(CH$_3$)(C$_2$H$_5$)], 2,3-bis (4-methoxyphenyl)-1-dibutylamino-5-methyl-3-hexanol [I; R is CH$_2$CH(CH$_3$)$_2$, Ar and Ar' are 4-CH$_3$OC$_6$H$_4$, N=B is N(C$_4$H$_9$)$_2$], 2,3-bis(4-methoxyphenyl)-1-dihexylamino-5-methyl-3-hexanol [I; R is CH$_2$CH(CH$_3$)$_2$, Ar and Ar' are 4-CH$_3$OC$_6$H$_4$, N=B is N(C$_6$H$_{13}$)$_2$], 2,3-bis(4-methoxyphenyl)-1-(1-piperidly)-5-methyl-3-hexanol [I; R is CH$_2$CH(CH$_3$)$_2$, Ar and Ar' are 4-CH$_3$OC$_6$H$_4$, N=B is NC$_5$H$_{10}$], 2,3-bis(4-methoxyphenyl)-1-(1-pyrrolidly)-5-methyl-3-hexanol [I; R is CH$_2$CH(CH$_3$)$_2$, Ar and Ar' are 4-CH$_3$OC$_6$H$_4$, N=B is NC$_4$H$_8$], 2,3-bis(4-methoxyphenyl)-1-(4-morpholinyl)-5-methyl-3-hexanol [I; R is CH$_2$CH(CH$_3$)$_2$, Ar and Ar' are 4-CH$_3$OC$_6$H$_4$, N=B is NC$_4$H$_9$O], or 2,3-bis(4-methoxyphenyl)-1-(2-methyl-1-piperidyl)-5-methyl-3-hexanol [I; R is CH$_2$CH(CH$_3$)$_2$, Ar and Ar' are 4-CH$_3$OC$_6$H$_4$, N=B is NC$_5$H$_9$(CH$_3$)].

The free base, 2,3-bis(4-methoxyphenyl)-1-dimethylamino-5-methyl-3-hexanol can be prepared by treating an aqueous solution of its hydrochloride salt with an excess of sodium hydroxide solution, and extracting the resulting base. The free base can then be reacted with various acids and esters, e.g., hydrofluoric acid, hydrobromic acid, quinic acid, ethanesulfonic acid, methyl iodide, ethyl bromide, or benzyl chloride, to give, respectively, the hydrofluoride, hydrobromide, quinate, ethanesulfonate, methiodide, ethobromide, or benzochloride salts of 2,3-bis(4-methoxyphenyl)-1-dimethylamino-5-methyl-3-hexanol.

The hydrofluoride salt of 2,3-bis(4-methoxyphenyl)-1-dimethylamino-5-methyl-3-hexanol can be converted to the hydrochloride salt by passing is through an ion exchange resin saturated with chloride ion.

2,3 - bis(4 - methoxyphenyl) - 1 - dimethylamino - 5-methyl-3-hexanol methiodide was prepared from the free base and an excess of methyl iodide in benzene solution, and had the M.P. 226.5–228 °C. (corr.) when recrystallized from a methanol-petroleum ether (Skellysolve C) mixture.

*Analysis.*—Calcd. for $C_{24}H_{36}INO_3$: C, 56.14; H, 7.07; I, 24.72. Found: C, 56.23; H, 6.79; I, 25.01.

2,3 - bis(4 - methoxyphenyl) - 1 - dimethylamino - 5-methyl-3-hexanol methiodide was found to be at least twice as active as tetraethylammonium bromide in blockade of the sympathetic ganglia when measured by the carotid occlusion method in dogs.

Example 2

2,3 - bis(4 - methoxyphenyl) - 1 - dimethylamino - 3-nonanol [I; R is $(CH_2)_5CH_3$, Ar and Ar' are $4\text{-}CH_3OC_6H_4$, N=B is $N(CH_3)_2$] was prepared from 12.5 g. of 1,2-bis(4-methoxyphenyl)-3-dimethylamino-1-propane and the Grignard reagent from 2.9 g. of magnesium and 19.8 g. of n-hexyl bromide, according to the manipulative procedure described above in Example 1, part (b). There was thus obtained 14.6 g. of 2,3-bis(4-methoxyphenyl)-1-dimethylamino-3-nonanol in the form of its hydrochloride salt, M.P. 180–183° C. A sample of the hydrochloride salt when recrystallized from an isopropyl alcohol-ether mixture had the M.P. 184.5–186.5° C. (corr.).

*Analysis.*—Calcd. for $C_{25}H_{37}NO_3 \cdot HCl$: C, 68.86; H, 8.79; Cl, 8.13. Found: C, 68.64; H, 8.63; Cl, 8.23.

2,3 - bis(4 - methoxyphenyl) - 1 - dimethylamino - 3-nonanol hydrochloride was found to have a cardiac decelerator activity of 50 micrograms per heart (approximate effective dose, $AED_{50}$) when measured upon the isolated rabbit heart. This compound was also found to cause an 80% inhibition of testicular growth in the immature male rat when administered subcutaneously at a dose level of 20 mg./kg./day. No androgenic or estrogenic activity was observed at dose levels as high as 40 mg./kg./day. These tests taken all together indicate the usefulness of this compound as a pituitary inhibitor.

2,3 - bis(4 - methoxyphenyl) - 1 - dimethylamino - 3-nonanol hydrochloride was found to have a coronary dilator activity 9 times that of papaverine when measured on the isolated rabbit heart.

Example 3

2,3 - bis(4 - methoxyphenyl) - 3 - cyclohexyl - 1 - dimethylamino-3-propanol [I; R is $C_6H_{11}$, Ar and Ar' are $4\text{-}CH_3OC_6H_4$, N=B is $N(CH_3)_2$] was prepared from 12.5 g. of 1,2-bis(4-methoxyphenyl)-3-dimethylamino-1-propane and the Grignard reagent from 2.9 g. of magnesium and 19.6 g. of cyclohexyl bromide, according to the manipulative procedure given above in Example 1, part (b). There was thus obtained 12 g. of 2,3-bis(4-methoxyphenyl) - 3 - cyclohexyl - 1 - dimethylamino - 3-propanol in the form of its hydrochloride salt, which had the M.P. 212–213° C. (corr.) when recrystallized from an ethanol-ether mixture.

*Analysis.*—Calcd. for $C_{25}H_{35}NO_3 \cdot HCl$: C, 69.18; H, 8.36; Cl, 8.17. Found: C, 69.63; H, 8.32; Cl, 7.77.

2,3 - bis(4 - methoxyphenyl) - 3 - cyclohexyl - 1 - dimethylamino-3-propanol hydrochloride was found to have a cardiac decelerator activity of 54 micrograms per heart (approximate effective dose, $AED_{50}$) when measured upon the isolated rabbit heart.

Example 4

2,3 - bis(4 - methoxyphenyl) - 1 - dimethylamino - 3-undecanol [I; R is $(CH_2)_7CH_3$, Ar and Ar' are $4\text{-}CH_3OC_6H_4$, N=B is $N(CH_3)_2$] was prepared from 6.9 g. (0.022 mole) of 1,2-bis(4-methoxyphenyl)-3-dimethylamino-1-propanone and the Grignard reagent from 1.6 g. (0.066 mole) of magnesium and 12.7 g. (0.066 mole) of n-octyl bromide, according to the manipulative procedure given above in Example 1, part (b). There was thus obtained 2,3-bis(4-methoxyphenyl)-1-dimethylamino-3-undecanol in the form of its hydrochloride salt, which had the M.P. 163–167° C. (corr.) when recrystallized from an acetone-ether mixture.

*Analysis.*—Calcd. for $C_{27}H_{41}NO_3 \cdot HCl$: C, 69.86; H, 9.12; Cl, 7.64. Found: C, 69.69; H, 9.01; Cl, 7.65.

2,3 - bis(4 - methoxyphenyl) - 1 - dimethylamino - 3-undecanol hydrochloride was found to have a coronary dilator activity 5 times that of papaverine when measured on the isolated rabbit heart.

Example 5

(a) 1,2 - bis(4 - methoxyphenyl) - 3 - diethylamino-1-propanone [III; Ar and Ar' are $4\text{-}CH_3OC_6H_4$, N=B is $N(C_2H_5)_2$] was prepared from 76.9 of desoxyanisoin, 34.4 g. of diethylamine hydrochloride and 20 g. of paraformaldehyde according to the manipulative procedure described above in Example 1, part (a). There was thus obtained 41.3 g. of 1,2-bis(4-methoxyphenyl)-3-dimethylamino-1-propanone in the form of its hydrochloride salt, M.P. 137–150° C. After conversion to the free base, reconversion to the hydrochloride salt and recrystallization of this from an ethanol-ether mixture, a sample of 1,2-bis(4 - methoxyphenyl) - 3 - diethylamino - 1 - propanone hydrochloride with the M.P. 141.5–144° C. (corr.) was obtained.

*Analysis.*—Calcd. for $C_{21}H_{27}NO_3 \cdot HCl$: C, 66.74; H, 7.47; Cl, 9.38. Found: C, 66.95; H, 7.64; Cl, 9.52.

1,2 - bis(4 - methoxyphenyl) - 3 - diethylamino - 1-propanone in the form of its methiodide salt had the M.P. 152–153° C. (corr.) when recrystallized from an ethyl acetate-methanol mixture.

*Analysis.*—Calcd. for $C_{22}H_{30}INO_3$: C, 54.66, H, 6.26; I, 26.26. Found: C, 54.68; H, 6.10; I, 26.04.

(b) 2,3 - bis(4 - methoxyphenyl) - 1 - diethylamino-3-tridecanol [I; R is $(CH_2)_9CH_3$, Ar and Ar' are $4\text{-}CH_3OC_6H_4$, N=B is $N(C_2H_5)_2$] can be prepared from 1,2 - bis(4 - methoxyphenyl) - 3 - diethylamino - 1 - propanone and n-decylmagnesium bromide according to the manipulative procedure described above in Example 1, part (b).

Example 6

(a) 1,2 - bis(4-methoxyphenyl)-3-(1-piperidyl)-1-propanone [III; Ar and Ar' are $4\text{-}CH_3OC_6H_4$, N=B is $NC_5H_{10}$] was prepared from 76.9 g. of desoxyanisoin, 38.2 g. of piperidine hydrochloride and 20 g. of paraformaldehyde according to the manipulative procedure described above in Example 1, part (a). There was thus obtained 74.0 g. of 1,2-bis(4-methoxyphenyl)-3-(1-piperidyl)-1-propanone in the free base form. This was divided into two portions and one of these was converted to the hydrochloride, and the other to the methiodide salt form. 1,2 - bis(4-methoxyphenyl)-3-(1-piperidyl)-1-propanone hydrochloride had the M.P. 178–180° C. (corr.) when recrystallized from an ethanol-ether mixture.

*Analysis.*—Calcd. for $C_{22}H_{27}NO_3 \cdot HCl$: C, 67.77; H, 7.24; Cl, 9.09. Found: C, 67.90; H, 7.33; Cl, 8.85.

1,2 - bis(4 - methoxyphenyl) - 3 - (1-piperidyl)-1-propanone methiodide had the M.P. 221.5–222.5° C. (corr.) when recrystallized from an ethyl acetate-methanol mixture.

*Analysis.*—Calcd. for $C_{23}H_{30}INO_3$: C, 55.76; H, 6.10; I, 25.62. Found: C, 56.00; H, 6.39; I, 26.06.

(b) 2,3 - bis(4-methoxyphenyl)-5-methyl-1-(1-piperidyl)-3-hexanol [I; R is $CH_2CH(CH_3)_2$, Ar and Ar' are $4\text{-}CH_3OC_6H_4$, N=B is $NC_5H_{10}$] was prepared from 17.7 g. (0.05 mole) of 1,2-bis(4-methoxyphenyl)-3-(1-piperidyl)-

1-propanone and the Grignard reagent from 2.9 g. (0.12 mole) of magnesium and 17.0 g. (0.12 mole) of isobutyl bromide, according to the manipulative procedure described above in Example 1, part (*b*). There was thus obtained 8.5 g. of 2,3-bis(4-methoxyphenyl)-5-methyl-1-(1-piperidyl)-3-hexanol in the form of its hydrochloride salt, M.P. 193–194.5° C. (corr.) when recrystallized from an ethanol-ether mixture.

*Analysis.*—Calcd. for $C_{26}H_{37}NO_3 \cdot HCl$: C, 69.70; H, 8.55; Cl, 7.91. Found: C, 69.90; H, 8.50; Cl, 7.67.

2,3 - bis(4-methoxyphenyl)-5-methyl-1-(1-piperidyl)-3-hexanol hydrochloride was found to have a cardiac decelerator activity of 23 micrograms per heart (approximate effective dose, $AED_{50}$) when measured upon the isolated rabbit heart.

Example 7

(*a*) *1,2 - bis(4-methoxyphenyl)-3-(4-morpholinyl)-1-propanone* [III; Ar and Ar′ are $4\text{-}CH_3OC_6H_4$, N=B is $NC_4H_8O$] was prepared from 76.9 g. of desoxyanisoin, 38.8 g. of morpholine hydrochloride and 18.0 g. of paraformaldehyde according to the manipulative procedure described above in Example 1, part (*a*). There was thus obtained 75.0 g. of 1,2-bis(4-methoxyphenyl)-3-(4-morpholinyl)-1-propanone in the form of its hydrochloride salt, M.P. 186.5–188.5° C. (corr.) when recrystallized from a methanol-ether mixture.

*Analysis.*—Calcd. for $C_{21}H_{25}NO_4 \cdot HCl$: C, 64.36; H, 6.69; Cl, 9.05. Found: C, 64.29; H, 6.83; Cl, 9.13.

1,2 - bis(4 - methoxyphenyl)-3-(4-morpholinyl)-1-propanone in the form of its methiodide salt had the M.P. 194.5–197° C. (corr.) when recrystallized from an ethyl acetate-methanol mixture.

*Analysis.*—Calcd. for $C_{22}H_{28}INO_4$: C, 53.12; H, 5.68; I, 25.52. Found: C, 53.14; H, 5.42; I, 25.76.

(*b*) *1,2 - bis(4 - methoxyphenyl)-1-cyclopentyl-3-(4-morpholinyl)-1-propanol* [I; R is $C_5H_9$, Ar and Ar′ are $4\text{-}CH_3OC_6H_4$, N=B is $NC_4H_8O$] can be prepared from 1,2 - bis(4-methoxyphenyl)-1-(4-morpholinyl)-1-propanone and cyclopentylmagnesium bromide according to the manipulative procedure described above in Example 1, part (*b*).

Example 8

*2,3 - bis(4-methoxyphenyl)-1-dimethylamino-6-methyl-3-octanol* [I; R is $CH_2CH_2CH(CH_3)CH_2CH_3$, Ar and Ar′ are $4\text{-}CH_3OC_6H_4$, N=B is $N(CH_3)_2$] was prepared from 15.6 g. of 1,2-bis(4-methoxyphenyl)-3-dimethylamino-1-propanone and the Grignard reagent from 3.6 g. of magnesium and 25 g. of 1-bromo-3-methylpentane according to the manipulative procedure described above in Example 1, part (*b*), except that the Grignard reagent was prepared in tetrahydrofuran instead of ether. The product was recrystallized from an isopropyl alcohol-ethyl acetate mixture to give 13.2 g. of 2,3-bis(4-methoxyphenyl)-1-dimethylamino-6-methyl-3-octanol in the form of its hydrochloride salt, M.P. 181.2–183.6° C. (corr.).

*Analysis.*—Calcd. for $C_{25}H_{37}NO_3 \cdot HCl$: C, 68.86; H, 8.78; Cl, 8.13. Found: C, 68.70; H, 8.80; Cl, 8.12.

2,3 - bis(4 - methoxyphenyl)-1-dimethylamino-6-methyl-3-octanol hydrochloride was found to have a coronary dilator activity 3.8 times that of papaverine when measured on the isolated rabbit heart.

Example 9

*2,3 - bis(4 - methoxyphenyl)-1-dimethylamino-5-cyclohexyl-3-pentanol* [I; R is $CH_2CH_2C_6H_{11}$, Ar and Ar′ are $4\text{-}CH_3OC_6H_4$, N=B is $N(CH_3)_2$] was prepared from 15.6 g. of 1,2 - bis(4-methoxyphenyl)-3-dimethylamino-1-propanone and the Grignard reagent from 3.6 g. of magnesium and 28.6 g. of 2-cyclohexylethyl bromide according to the manipulative procedure described above in Example 1, part (*b*). The product was recrystallized from isopropyl alcohol to give 10.0 g. of 2,3-bis(4-methoxyphenyl)-1-dimethylamino-5-cyclohexyl-3-pentanol in the form of its hydrochloride salt, M.P. 226.0–227.0° C. (dec.) (corr.).

*Analysis.*—Calcd. for $C_{27}H_{39}NO_3 \cdot HCl$: C, 70.18; H, 8.73; Cl, 7.67. Found: C, 70.01; H, 8.66; Cl, 7.58.

2,3 - bis(4 - methoxyphenyl)-1-dimethylamino-5-cyclohexyl-3-pentanol hydrochloride was found to have a coronary dilator activity 4.6 times that of papaverine when measured on the isolated rabbit heart.

Example 10

*2,3 - bis(4 - methoxyphenyl) - 1 - dimethylamino-3-tridecanol* [I; R is $(CH_2)_9CH_3$, Ar and Ar′ are $4\text{-}CH_3OC_6H_4$, N=B is $N(CH_3)_2$] was prepared from 15.6 g. of 1,2-bis(4-methoxyphenyl)-3-dimethylamino-1-propanone and the Grignard reagent from 3.6 g. of magnesium and 33 g. of n-decyl bromide according to the manipulative procedure described above in Example 1, part (*b*), except that the Grignard reagent was prepared in tetrahydrofuran instead of ether. The product was recrystallized from ethyl acetate to give 12.2 g. of 2,3-bis(4-methoxyphenyl)-1-dimethylamino-3-tridecanol, M.P. 165.0–166.8° C. (corr.).

*Analysis.*—Calcd. for $C_{29}H_{45}NO_3 \cdot HCl$: C, 70.77; H, 9.42; Cl, 7.21; O, 9.75. Found: C, 71.58; H, 9.32; Cl, 7.50; O, 9.55.

2,3 - bis(4 - methoxyphenyl) - 1 - dimethylamino-3-tridecanol hydrochloride was found to have a coronary dilator activity 4 times that of papaverine when measured on the isolated rabbit heart.

Example 11

*2,3-bis(4-methoxyphenyl)-1 - dimethylamino-3-decanol* [I; R is $(CH_2)_6CH_3$, Ar and Ar′ are $4\text{-}CH_3OC_6H_4$, N=B is $N(CH_3)_2$] was prepared from 15.6 g. of 1,2-bis(4-methoxyphenyl)-3-dimethylamino-1-propanone and the Grignard reagent from 3.6 g. of magnesium and 27 g. of n-heptyl bromide according to the manipulative procedure described above in Example 1, part (*b*), except that the Grignard reagent was prepared in tetrahydrofuran instead of ether. The product was recrystallized from ethyl acetate to give 11.7 g. of 2,3-bis(4-methoxyphenyl)-1-dimethylamino-3-decanol in the form of its hydrochloride salt, M.P. 172.4–173.2° C. (corr.).

*Analysis.*—Calcd. for $C_{26}H_{39}NO_3 \cdot HCl$: C, 69.39; H, 8.96; Cl, 7.88. Found: C, 69.34; H, 9.21; Cl, 7.75.

2,3-bis(4-methoxyphenyl) - 1-dimethylamino-3-decanol hydrochloride was found to have a coronary dilator activity 3 times that of papaverine when measured on the isolated rabbit heart.

Example 12

*2,3-bis(4-methoxyphenyl)-1 - dimethylamino-6-phenyl-3-hexanol* [I; R is $(CH_2)_3C_6H_5$, Ar and Ar′ are $4\text{-}CH_3OC_6H_4$, N=B is $N(CH_3)_2$] was prepared from 35 g. of 1,2-bis(4-methoxyphenyl)-3-dimethylamino-1-propanone and the Grignard reagent from 7.3 g. of magnesium and 60 g. of 3-phenylpropyl bromide according to the manipulative procedure described above in Example 1, part (*b*), except that the Grignard reagent was prepared in tetrahydrofuran instead of ether. The product was recrystallized from ethyl acetate to give 29 g. of 2,3-bis(4-methoxyphenyl)-1-dimethylamino - 6-phenyl-3-hexanol in the form of its hydrochloride salt, M.P. 187.0–188.2° C. (corr.).

*Analysis.*—Calcd. for $C_{28}H_{35}NO_3 \cdot HCl$: C, 71.55; H, 7.72; O, 10.21. Found: C, 71.46; H, 7.91; O, 10.10.

Example 13

*2,3-bis(4-methoxyphenyl)-1 - dimethylamino-4-methyl-3-undecanol* [I; R is $CH(CH_3)C_7H_{15}$, Ar and Ar′ are $4\text{-}CH_3OC_6H_4$, N=B is $N(CH_3)_2$] can be prepared from 1,2-bis(4-methoxyphenyl)-3 - dimethylamino-1-propanone and the Grignard reagent from 1-methyloctyl bromide according to the manipulative procedure described above in Example 1, part (*b*).

Example 14

*1,1,2-tris(4-methoxyphenyl) - 3 - dimethylamino-1-propanol* [I; R, Ar and Ar' are 4-CH$_3$OC$_6$H$_4$, N=B is N(CH$_3$)$_2$].

A solution of 4-methoxyphenylmagnesium bromide [prepared from 56.1 g. (0.3 mole) of 4-bromoanisole and 7.2 g. (0.3 mole) of magnesium in 250 ml. of dry ether] was treated at 0° C. with a solution of 31.3 g. (0.1 mole) of 1,2-bis(4-methoxyphenyl)-3 - dimethylamino - 1 - propanone in 400 ml. of toluene. The ether was removed by distillation, and the remaining mixture was refluxed (internal temperature 108° C.) for three hours. After standing at room temperature for about fifteen hours, the mixture was hydrolyzed by pouring it into 1 liter of ice water containing 275 g. of ammonium chloride. The organic layer was separated, the aqueous layer extracted with three 75 ml. portions of benzene, and the combined organic solutions washed twice with water. The solvent was removed in vacuo, the residue triturated with absolute alcohol and filtered. The alcoholic filtrate was concentrated in vacuo, giving 63.5 g. of 1,1,2-tris(4-methoxyphenyl)-3-dimethylamino-1-propanol, in the form of a dark red oil. The methiodide of 1,1,2-tris(4-methoxyphenyl)-3-dimethylamino-1-propanol, prepared by heating a portion of the free base in benzene solution with an excess of methyl iodide, had the M.P. 194.6–196.9° C. (corr.) when recrystallized twice from an ethyl acetate-methanol mixture.

*Analysis.*—Calcd. for C$_{27}$H$_{34}$INO$_4$: C, 57.57; H, 6.08; I, 22.52. Found: C, 57.30; H, 6.20; I, 22.08.

The free base, 1,1,2-tris(4-methoxyphenyl)-3-dimethylamino-1-propanol, had the M.P. 102.6–107.0° C. (corr.).

*Analysis.*—Calcd. for C$_{26}$H$_{31}$NO$_4$: C, 74.08; H, 7.41; O, 15.18. Found: C, 74.42; H, 7.34; O, 15.30.

By replacement of the 1,2-bis(4-methoxyphenyl)-3-dimethylamino-1-propanone in the preceding preparation by a molar equivalent amount of 1,2-bis(4-ethoxyphenyl)-3-dimethylamino-1-propanone,
1-(4-methoxyphenyl)-2-(4-ethoxyphenyl) - 3 - dimethylamino-1-propanone,
1-(4-chlorophenyl)-2-(3 - methoxyphenyl) - 3 - dimethylamino-1-propanone (from p-chlorophenyl m-methoxybenzyl ketone, dimethylamine and paraformaldehyde),
1,2-bis(4-methylmercaptophenyl) - 3 - dimethylamino-1-propanone (from 4,4'-bis(methylmercapto)desoxybenzoin, dimethylamine and paraformaldehyde),
1,2-bis(4-methoxyphenyl)-3-diethylamino-1-propanone,
1,2-bis(4-methoxyphenyl)-3-dipropylamino-1-propanone,
1,2-bis(4-methoxyphenyl)-3-methylethylamino - 1 - propanone,
1,2-bis(4-methoxyphenyl)-3-dibutylamino-1-propanone,
1,2-bis(4-methoxyphenyl)-3-dihexylamino-1-propanone,
1,2-bis(4-methoxyphenyl)-3-(1-pyrrolidyl)-1-propanone,
1,2-bis(4-methoxyphenyl) - 3 - (4 - morpholinyl)-1-propanone, or
1,2-bis(4-methoxyphenyl) - 3 - (2-methyl-1-piperidyl)-1-propanone, there can be obtained, respectively, 1,2-bis(4-ethoxyphenyl)-1-(4 - methoxyphenyl)-3-dimethylamino-1-propanol [I; R is 4-CH$_3$OC$_6$H$_4$, Ar and Ar' are 4-C$_2$H$_5$OC$_6$H$_4$, N=B is N(CH$_3$)$_2$],
1,2-bis(4-methoxyphenyl)-2-(4 - ethoxyphenyl)-3-dimethylamino-1-propanol [I; R is 4-CH$_3$OC$_6$H$_4$, Ar is 4-CH$_3$OC$_6$H$_4$, Ar' is 4-C$_2$H$_5$OC$_6$H$_4$, N=B is N(CH$_3$)$_2$],
1-(4-chlorophenyl)-1-(4-methoxyphenyl)-2 - (3-methoxyphenyl)-3-dimethylamino - 1 - propanol [I; R is 4-CH$_3$OC$_6$H$_4$, Ar is 4-ClC$_6$H$_4$, Ar' is 3-CH$_3$OC$_6$H$_4$, N=B is N(CH$_3$)$_2$],
1,2-bis(4-methylmercaptophenyl)-1 - (4-methoxyphenyl)-3-dimethylamino-1-propanol [I; R is 4-CH$_3$OC$_6$H$_4$, Ar and Ar' are 4-CH$_3$SC$_6$H$_4$, N=B is N(CH$_3$)$_2$],
1,1,2-tris(4-methoxyphenyl)-3-diethylamino - 1 - propanol [I; R, Ar and Ar' are 4-CH$_3$OC$_6$H$_4$, N=B is N(C$_2$H$_5$)$_2$],
1,1,2-tris(4-methoxyphenyl)-3-dipropylamino - 1-propanol [I; R, Ar and Ar' are 4-CH$_3$OC$_6$H$_4$, N=B is N(C$_3$H$_7$)$_2$],
1,1,2-tris(4 - methoxyphenyl) - 3 - methylethylamino-1-propanol [I; R, Ar and Ar' are 4-CH$_3$OC$_6$H$_4$, N=B is N(CH$_3$)(C$_2$H$_5$)],
1,1,2-tris(4-methoxyphenyl)-3-dibutylamino - 1-propanol [I; R, Ar and Ar' are 4-CH$_3$OC$_6$H$_4$, N=B is N(C$_4$H$_9$)$_2$],
1,1,2-tris(4-methoxyphenyl)-3-dihexylamino - 1-propanol [I; R, Ar and Ar' are 4-CH$_3$OC$_5$H$_4$, N=B is N(C$_6$H$_{13}$)$_2$],
1,1,2-tris(4-methoxyphenyl)-3-(1-pyrrolidyl) - 1-propanol [I; R, Ar and Ar' are 4-CH$_3$OC$_6$H$_4$, N=B is NC$_4$H$_8$],
1,1,2-tris(4-methoxyphenyl)-3 - (4 - morpholinyl)-1-propanol [I; R, Ar and Ar' are CH$_3$OC$_6$H$_4$, N=B is NC$_4$H$_8$O], or
1,1,2-tris(4-methoxyphenyl)-3-(2-methyl - 1-piperidyl)-1-propanol [I; R, Ar and Ar' are 4-CH$_3$OC$_6$H$_4$, N=B is NC$_5$H$_9$(CH$_3$)].

Example 15

*1,1,2-tris(4-methoxyphenyl) - 3 -( 1-piperidyl) - 1-propanol* [I; R, Ar and Ar' are 4-CH$_3$OC$_6$H$_4$, N=B is NC$_5$H$_{10}$] was prepared from 17.8 g. of 1,2-bis(4-methoxyphenyl)-3-dimethylamino-1-propanone, 28.1 g. of p-bromoanisole and 3.6 g. of magnesium according to the manipulative procedure described above in Example 14. The product was recrystallized first from aqueous dimethylformamide and then from an acetone-ether mixture to give 1,1,2-tris(4-methoxyphenyl)-3 - (1-piperidyl)-1-propanol in the form of its hydrochloride salt, M.P. 120.4–132.4° C. (corr.).

*Analysis.*—Calcd. for C$_{29}$H$_{35}$NO$_4$·HCl: Cl, 7.12; O,12.9. Found: Cl, 6.92; O, 12.8.

1,1,2-tris(4-methoxyphenyl)-3-(1-piperidyl)-1-propanol hydrochloride was found to have a coronary dilator activity 1.5 times that of papaverine when measured on the isolated rabbit heart. It had an intravenous toxicity (LD$_{50}$) in mice of 43±3.6 mg./kg.

Example 16

*2-(3,4,5-trimethoxyphenyl) - 3 - (4-methoxyphenyl)-1-dimethylamino-3-nonanol* [I; R is (CH$_2$)$_5$CH$_3$, Ar is 4-CH$_3$OC$_6$H$_4$, Ar' is 3,4,5-(CH$_3$O)$_3$C$_6$H$_2$, N=B is N(CH$_3$)$_2$] can be prepared by reacting 4-methoxyphenyl 3,4,5-trimethoxybenzyl ketone (prepared by a Friedel Crafts reaction between 4-methoxyphenylacetyl chloride and 3,4,5-trimethoxybenzene), dimethylamine and formaldehyde to produce 1-(4-methoxyphenyl)-2-(3,4,5-trimethoxyphenyl)-3-dimethylamino-1-propanone, and then reacting the latter with n-hexylmagnesium bromide according to the manipulative procedures described hereinabove.

Example 17

*1,2-bis(4-bromophenyl)-1-(4 - methylmercaptophenyl)-3-dimethylamino-1-propanol* [I; R is 4-CH$_3$SC$_6$H$_4$, Ar and Ar' are 4-BrC$_6$H$_4$, N=B is N(CH$_3$)$_2$] can be prepared by reacting 4-bromophenyl 4-bromobenzyl ketone, dimethylamine and formaldehyde to produce 1,2-bis(4-bromophenyl)-3-dimethylamino-1-propanone, and then reacting the latter with 4-methylmercaptophenylmagnesium bromide according to the manipulative procedure described hereinabove.

This application is a continuation-in-part of my copending applications, Serial Nos. 638,200, filed February 5, 1957, and now U.S. Patent 3,010,965, and 638,430, filed February 6, 1957, and now abandoned.

I claim:
1. Compounds having the formula

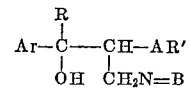

wherein Ar and Ar' represent phenyl substituted by from one to three members of the group consisting of lower-alkoxy, lower-alkylmercapto and halogen; R represents a member of the group consisting of alkyl having from four to ten carbon atoms, cycloalkyl having 5–6 ring members, cycloalkyl-lower-alkyl having 5–6 ring members, phenyl-lower-alkyl, and phenyl substituted by from one to three members of the group consisting of lower-alkoxy and lower-alkylmercapto; and N=B represents a member of the group consisting of di-lower-alkylamino, 1-piperidyl, 1-pyrrolidyl, 4-morpholinyl, lower-alkylated 1-piperidyl, lower-alkylated 1-pyrrolidyl and lower-alkylated 4-morpholinyl.

2. Compounds having the formula

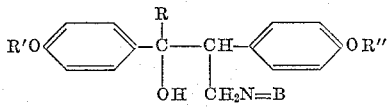

wherein R represents alkyl having from four to ten carbon atoms, R' and R" represent lower-alkyl, and N=B represents di-lower-alkylamino.

3. Compounds having the formula

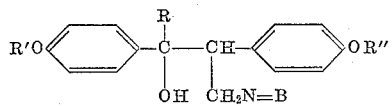

wherein R represents alkyl having from four to ten carbon atoms, R' and R" represent lower-alkyl, and N=B represents 1-piperidyl.

4. Compounds having the formula

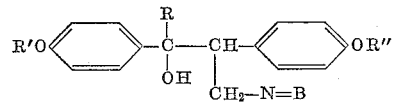

wherein R represents cycloalkyl having 5–6 ring members, R' and R" represent lower-alkyl, and N=B represents di-lower-alkylamino.

5. Compounds having the formula

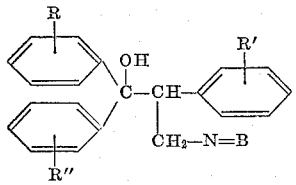

wherein R, R' and R" represent lower-alkoxy and N=B represents di-lower-alkylamino.

6. Compounds having the formula

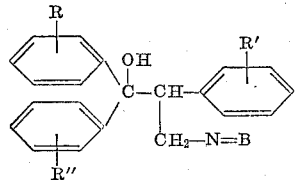

wherein R, R' and R" represent lower-alkoxy and N=B represents 1-piperidyl.

7. 2,3-bis(4-methoxyphenyl) - 1 - dimethylamino - 5 - methyl-3-hexanol.

8. 2,3-bis(4 - methoxyphenyl) - 1 - dimethylamino - 3 - nonanol.

9. 1,2-bis(4-methoxyphenyl) - 1 - cyclohexyl - 3 - dimethylamino-1-propanol.

10. 2,3-bis(4 - methoxyphenyl - 5 - methyl - 1 - (1 - piperidyl)-3-hexanol.

11. 2,3-bis(4-methoxyphenyl) - 1 - dimethylamino - 3 - undecanol.

12. 2,3-dianisyl - 1 - dimethylamino - 6 - methyl - 3 - octanol.

13. 2,3-bis(4-methoxyphenyl) - 1 - dimethylamino - 5-cyclohexyl-3-pentanol.

14. 2,3-bis(4 - methoxyphenyl) - 1 - dimethylamino - 3-tridecanol.

15. 2,3-bis(4 - methoxyphenyl) - 1 - dimethylamino - 3-decanol.

16. 2,3-bis(4 - methoxyphenyl) - 1 - dimethylamino - 6-phenyl-3-hexanol.

17. 1,1,2-tris(4 - methoxyphenyl) - 3 - dimethylamino - 1-propanol.

18. 1,1,2-tris(4-methoxyphenyl) - 3 - (1-piperidyl - 1 - propanol.

References Cited by the Examiner
UNITED STATES PATENTS

| | | | |
|---|---|---|---|
| 2,485,662 | 10/49 | Rohrman | 260—294.7 |
| 2,515,700 | 7/50 | Denton et al. | 260—294.7 |
| 2,599,497 | 6/52 | Stoll et al. | 260—294.7 |
| 2,654,745 | 10/53 | Rhodehamel | 260—294.7 |
| 2,665,278 | 1/54 | Schultz | 260—294.7 |
| 2,680,115 | 6/54 | Ruddy et al. | 260—294.7 |
| 2,827,460 | 3/58 | Stein et al. | 260—294.7 |

FOREIGN PATENTS

| | | |
|---|---|---|
| 265,665 | 4/50 | Switzerland. |
| 269,078 | 10/50 | Switzerland. |
| 269,084 | 10/50 | Switzerland. |
| 525,839 | 5/31 | Germany. |
| 624,117 | 5/49 | Great Britain. |
| 624,118 | 5/49 | Great Britain. |
| 627,139 | 7/49 | Great Britain. |

OTHER REFERENCES

Denton et al.: Journal of the American Chemical Society, vol. 71: page 2052 (1949).

Huebner: Journal of Organic Chemistry, vol. 18: pages 736–739 (1953).

IRVING MARCUS, *Primary Examiner.*

H. J. LIDOFF, D. T. McCUTCHEN, *Examiners.*

UNITED STATES PATENT OFFICE
CERTIFICATE OF CORRECTION

Patent No. 3,161,646            December 15, 1964

Bill Elpern

It is hereby certified that error appears in the above numbered patent requiring correction and that the said Letters Patent should read as corrected below.

Column 6, line 62, for "$NC_4H_3O$" read -- $NC_4H_8O$ --; column 7, lines 26 and 58, for "propane", each occurrence, read -- propanone --; column 8, lines 26 and 27, for "-3-dimethylamino-" read -- -3-diethylamino- --; column 12, line 9, for "$4-CH_3OC_5H_4$" read -- $4-CH_3OC_6H_4$ --; same column 12, lines 70 to 73, the formula should appear as shown below instead of as in the patent:

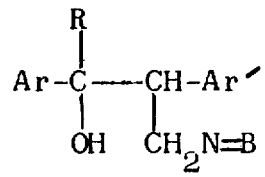

Signed and sealed this 11th day of May 1965.

(SEAL)
Attest:

ERNEST W. SWIDER            EDWARD J. BRENNER
Attesting Officer            Commissioner of Patents